United States Patent
Hsu

[11] Patent Number: 6,158,517
[45] Date of Patent: *Dec. 12, 2000

[54] ARTIFICIAL AQUIFERS IN HYDROLOGIC CELLS FOR PRIMARY AND ENHANCED OIL RECOVERIES, FOR EXPLOITATION OF HEAVY OIL, TAR SANDS AND GAS HYDRATES

[75] Inventor: Kenneth J. Hsu, Zurich, Switzerland

[73] Assignee: Tarim Associates for Scientific Mineral and Oil Exploration, Zurich, Switzerland

[*] Notice: This patent is subject to a terminal disclaimer.

[21] Appl. No.: 09/188,934

[22] Filed: Nov. 10, 1998

Related U.S. Application Data

[63] Continuation-in-part of application No. 08/852,327, May 7, 1997, and a continuation-in-part of application No. 09/041,503, Mar. 12, 1998.

[51] Int. Cl.[7] .................................................. E21B 43/21
[52] U.S. Cl. .................. 166/402; 166/272.2; 166/272.3; 166/272.7
[58] Field of Search ................ 166/271, 272.2, 166/272.3, 272.7, 402

[56] References Cited

U.S. PATENT DOCUMENTS

| | | |
|---|---|---|
| 4,162,808 | 7/1979 | Kvapil . |
| 4,192,552 | 3/1980 | Cha . |
| 4,381,873 | 5/1983 | Johnson . |
| 4,456,065 | 6/1984 | Heim et al. ........................... 166/272.3 |
| 4,627,493 | 12/1986 | Alameddine ......................... 166/272.3 |
| 4,634,187 | 1/1987 | Huff et al. . |
| 4,635,720 | 1/1987 | Chew ................................... 166/272.3 |
| 4,696,345 | 9/1987 | Hsueh .................................. 166/272.3 |
| 4,815,791 | 3/1989 | Schmidt et al. . |
| 4,869,322 | 9/1989 | Vogt, Jr. . |
| 5,103,907 | 4/1992 | Shu ...................................... 166/272.3 |
| 5,228,510 | 7/1993 | Jennings, Jr. . |
| 5,261,490 | 11/1993 | Ebinuma ................................ 166/402 |
| 5,645,322 | 7/1997 | Hsu et al. . |
| 5,860,475 | 1/1999 | Ejiogu et al. ......................... 166/272.3 |
| 5,868,202 | 2/1999 | Hsu ........................................ 166/261 |
| 6,016,873 | 1/2000 | Hsu et al. ............................... 166/402 |

FOREIGN PATENT DOCUMENTS

| | | |
|---|---|---|
| 148653 | 1/1980 | Germany . |
| 2076923 | 4/1997 | Russian Federation . |
| 1244291 | 7/1986 | U.S.S.R. . |
| 1308752 | 5/1987 | U.S.S.R. . |
| 1408056 | 7/1988 | U.S.S.R. . |

*Primary Examiner*—William Neuder
*Attorney, Agent, or Firm*—Helfgott & Karas, PC.

[57] ABSTRACT

Artificial aquifers for hydrologic cells are used to recover hydrocarbons from carbonaceous formations. Artificial aquifers of a hydrologic cell for primary or enhanced oil recovery are constructed through the use of a conventional hydrofrac technique to make a pair of vertical extensional fractures across two parallel horizontal boreholes. Hydrocarbons move under a pressure gradient from a source aquifer to a sink aquifer. In another arrangement, artificial aquifers for exploitation of tar sands and gas hydrates are constructed through the removal of hydrocarbons which plug the pore space of the host rock. Hydrocarbons are induced to move vertically across a very large cross-sectional area from a source aquifer to a sink aquifer.

15 Claims, 2 Drawing Sheets

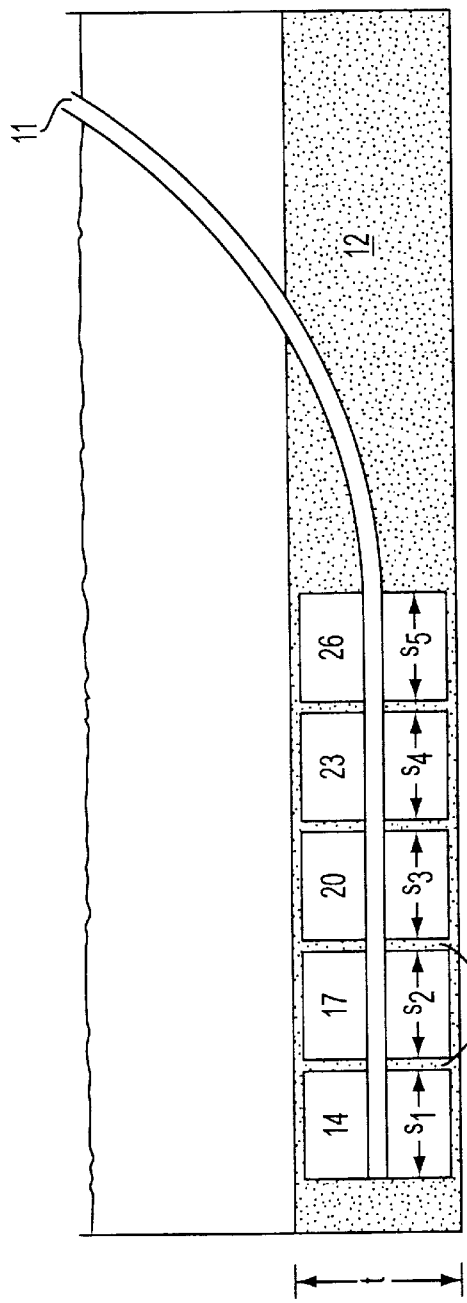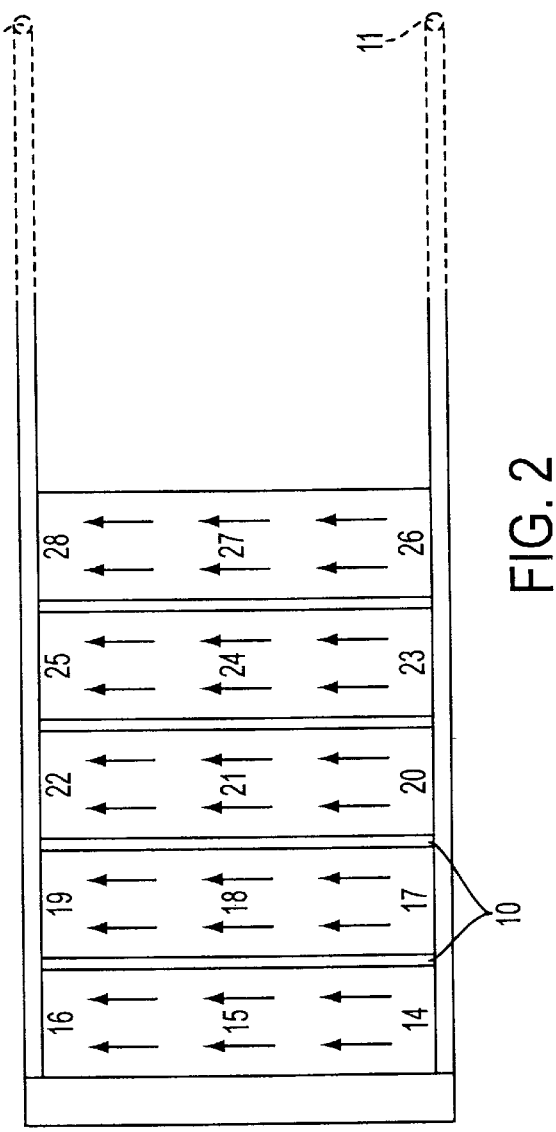

ARTIFICIAL AQUIFERS IN HYDROLOGIC CELLS FOR PRIMARY AND ENHANCED OIL RECOVERIES, FOR EXPLOITATION OF HEAVY OIL, TAR SANDS AND GAS HYDRATES

The present application is a continuation in part of Ser. No. 08/852,327 filed May 7, 1997 and Ser. No. 09/041,503 filed Mar. 12, 1988.

BACKGROUND OF THE INVENTION

1. Field of the Invention

The present invention relates in general to the recovery of hydrocarbons from underground geologic host formations and particularly relates to the sequential extraction of hydrocarbons from such formations using a series of artificial aquifers.

2. Description of Prior Developments

Hydrologic cells for recovery of hydrocarbons and thermal energy from carbonaceous formations have been described in U.S. patent application Ser. No. 08/852,327 and Ser. No. 09/041,503. Such cells increase the sweeping efficiency of oil recovery by fluid injection, and can recover hydrocarbons from heavy-oil reservoirs, tar sands and gas hydrates by steam-flooding, through the installation of artificial aquifers so that an injected fluid can be driven under a pressure differential from a source aquifer or injection well to a sink aquifer or producing well. The source and sink aquifers are formed by hydrofracturing between two wells. This invention proposes a different approach to the problem of making a long continuous fracture surface through a combination of the available techniques of drilling and hydro-fracturing.

SUMMARY OF THE INVENTION

The present invention has been developed to economically increase the efficiency of hydrocarbon extraction from underground host formations using a combination of hydrofracturing and fluid flooding to form a series of small artificial aquifers through a carbonaceous underground host formation. Vertically extending artificial aquifers are formed adjacent or through the host formations along a pair of wells or boreholes. The boreholes or wells can extend horizontally along the underground formations and a series of strips through the formations may be individually and sequentially flooded to drive out or extract the hydrocarbons in a step-by-step fashion.

The invention further includes the removal of hydrocarbons from between a pair of horizontally extending artificial aquifers formed by hydro-fracturing or by removal of hydrocarbons from a host rock formation so as to "unplug" a layer of the host rock and thereby create a porous artificial aquifer. In this case, one aquifer can overlay another and fluid pressure can be directed vertically upwardly to form a vertical hydrologic cell.

BRIEF DESCRIPTION OF THE DRAWINGS

In the drawings:

FIG. 1 is a view in section showing a profile of a hydrologic cell for enhanced oil recovery, and showing the position of a horizontal well related to the position of artificial aquifers formed from a hydro-fractured surface.

FIG. 2 is a top plan view of the hydrologic cell of FIG. 1 showing the fluid movement across pairs of vertically-oriented artificial aquifers, from 13 to 14, 17 to 19, 20 to 22, 23 to 25, . . . at successive intervals of time.

In the various figures of the drawings, like reference characters designate like parts.

DETAILED DESCRIPTION OF THE PREFERRED EMBODIMENTS

Figure 3:
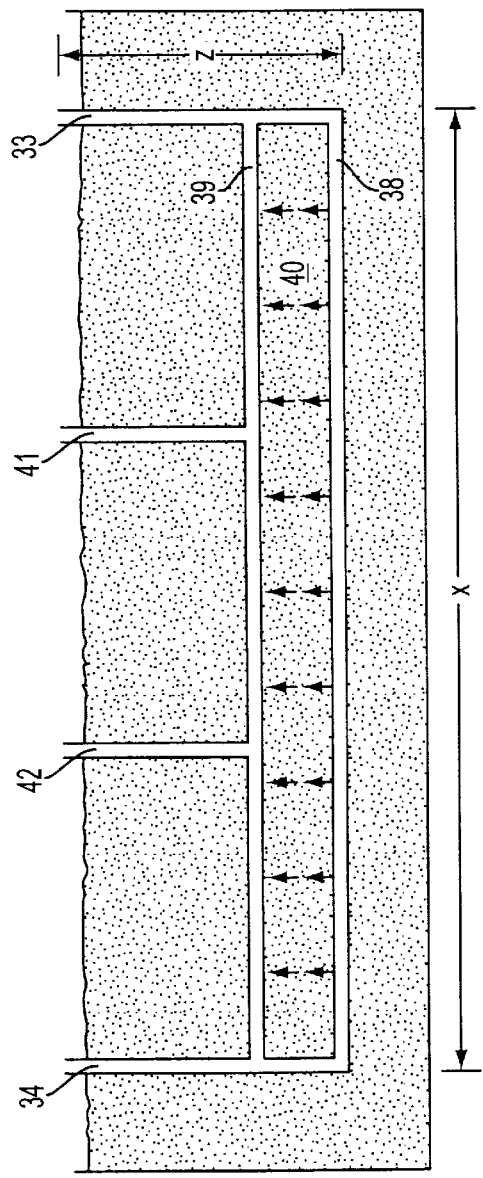
FIG. 3 is a view in section showing a profile of a hydrologic cell for exploitation of tar sand, and showing the positions of source and sink aquifers and the vertical movement of hydrocarbons between the aquifers.

Increase of Sweeping Efficiency of Fluid Injection

In applying conventional methods of hydrofracturing, an extensional fracture is formed in an orientation perpendicular to the direction of the least principal stress. As extensional fracture is formed after a reservoir formation is sufficiently weakened by increased pore pressure in the formation as a consequence of pumping fluid into the formation. The dimension of the fracture surface is limited by the practicality of building up the fluid pressure in porous and permeable formations. In oil reservoirs where the permeability of the reservoir sand is a few hundred millidarcies, a fracture surface commonly can have a half-width of only 10 or 20 meters from a borehole, because the pore pressure in the reservoir cannot be built up to form long continuous hydro-fractures between two wells in an oil field of normal spacing.

The current practice of water flooding in enhanced oil recovery makes use of a hydrologic cell driving fluid from one hydro-frac well to another hydro-frac well. The fluid injected into a hydro-frac well can sweep a wider path between the injection and production wells, but the injected fluid may not sweep the whole area between a pair of injection wells and a pair of production wells. Much of the oil between the wells, despite hydro-frac of the oil-bearing formations near boreholes, is trapped between the paths of the injected fluids and cannot be recovered.

To achieve nearly 100% sweeping efficiency in fluid-flooding requires the formation of a source aquifer and/or a sink aquifer. A hydro-fractured surface between two wells can be excavated and propped open by the introduction of proppants into each well until the hydrofracture surfaces from the two wells form an artificial aquifer as described in Appl. Ser. No. 08/852,327 noted above. This mechanism, also known as the propagation of Griffith fractures, operates in natural rock deformation under an induced stress differential. The cost of inducing a stress differential to cause the propagation of Griffith fractures between two wells is, at the present, too expensive to be practical.

An alternative is to use conventional techniques to form one continuous extensional fracture by hydro-frac through the drilling of numerous wells spaced closely together. Extensional fractures with a half-width of a few tens of meters around each borehole well can coalesce to form one continuous fracture surface, into which proppants can be injected to form a large artificial aquifer of a hydrologic cell. The high cost of drilling such densely spaced wells, however, renders the economics of such a method unattractive.

The present invention uses a combination of existing techniques including drilling, hydro-fracturing, and fluid-flooding to construct hydrologic cells with a high sweeping efficiency. Namely, the invention relies upon a combination of conventional hydro-frac and fluid flooding carried out in successive stages. Instead of making extensional fractures in formations around vertically drilled wells, pairs of wells are drilled, usually horizontally, situated more or less parallel to each other as shown in FIGS. 1 and 2. The invention then carries out the hydro-frac and the fluid injection in successive stages from one interval to an adjacent interval along the pair of the more or less parallel, usually horizontally extending, drilled wells. Where the geometry of the oil reservoir permits economizing, it is possible to use one artificial aquifer, either as a source or a sink aquifer, and one well, either as an injection well or production well. In such a case, the artificial aquifer can be constructed as described herein.

As shown in FIG. 1, at each stage of operation, fluid is injected across a short production interval such as interval $s_1$ of one well of the parallel, usually horizontal, wells 11, 13. The production interval can be defined by perforating the cell casings along this interval of well casing. The fluid injected into this interval of a few tens of meters or so, can build up enough fluid pressure in an oil-bearing reservoir formation 12 to cause its fracturing along a vertical surface 14. The half-width of the fracture around the well borehole should be several meters to a few tens of meters. Proppants can then be injected, if necessary, to further prop open the fracture and to form an artificial aquifer along the production interval $s_1$ of horizontal well 11. Fluid injection into this source aquifer builds up pressure, and moves under a pressure gradient to the sink aquifer 16 of another horizontal well 13, where the hydrocarbons driven out by the injected fluid are removed by pumping. The rate of the fluid movement depends upon the pressure gradient which can be adjusted by the rate of fluid injection and the rate of pumping.

As shown in FIG. 2 at each stage of hydro-frac and fluid-flooding, the injected fluid drives the hydrocarbons along a path or through a strip of oil reservoir 12 such as along production interval $s_1$ below area 15 between the source and sink aquifers 14, 16. After the hydrocarbons within the strip of oil reservoir 12 along interval $s_1$ are exploited, the length of production interval $s_1$ within both wells 11, 13 is plugged.

The continuation of the process respectively forms at successive stages fractures/aquifers 17/19, 20/22, 22/25, 26/28, . . . to exploit hydrocarbons from reservoir production strip intervals $s_2$, $s_3$, $s_4$, $s_5$, . . . as shown in FIGS. 1 and 2. The fluid injection sweeps only one production strip at any one time, but the continued application of the process in successive stages achieves the aim of being able to sequentially sweep the volume of hydrocarbons under the reservoir areas 15+18+21+24+27 . . . , thus obtaining a high (>90%) sweeping efficiency in water-flooding, steam-injection, or in other forms of fluid-driven oil recovery technology.

An important feature of the invention is that only one of the intervals $s_1$, $s_2$, $s_3$, $s_4$, $s_5$, . . . is perforated along the well casings of wells 11, 13 at any given time for pressure build-up and for fluid-flooding. The width of the fractures 14, 17, 20, 23, 26, . . . determines the thickness of the zone which is to be treated in an oil-bearing formation. It is possible that the thickness of the zone is equal to or slightly smaller than the oil-bearing formation as shown in FIG. 1.

Example Enhanced Oil Recovery in Rocky Mountain Region

The Rocky Mountain region has numerous small and medium sized oil fields. The oil reservoirs are commonly intercalated in flat-lying Mesozoic sandstone and shale sequences. The permeability of the oil reservoirs may range up to several hundred millidarcies. Some 25% to 35% of the hydrocarbons in the reservoirs are extracted and produced from vertical wells during primary recovery. Enhanced oil recovery by horizontal drilling may recover more hydrocarbons, but the practice is not economical in every instance. Enhanced oil recovery (EOR) in accordance with the present invention renders EOR by horizontal drilling profitable even at times of very low crude oil prices. This same practice can be used for primary recovery when the distribution of the oil pool is well defined.

In the case of EOR from oil fields in the Rocky Mountain region, the depth, thickness, and other reservoir characteristics of an oil bearing formation are typically known from production data obtained during the primary recovery phase. To apply the EOR process according to the present invention, downhole stress measurements have to be carried out to determine the directions of the maximum and minimum principal stresses $\sigma_1$ and $\sigma_3$. If EOR is to be carried out where the producing field has been abandoned, a new vertical well has to be drilled for stress measurement and for other information.

After the orientation of the residual stress field is determined, two parallel wells, spaced 400 meters apart, are drilled horizontally in a direction perpendicular to the direction of the least principal stress. The wells are drilled to a depth to penetrate the middle of the oil-bearing reservoir which is to be exploited. The wells can be drilled to a distance to reach the lateral limit of the oil reserve, or to an otherwise appropriate distance. After a well casing is set, it is perforated over an interval of a few tens of meters nearest to the termination of the well.

Fluid is pumped down the well into the oil bearing formation and through the perforations. The pore pressure $p_p$ of the formation is built up around the perforated interval, and is increased to approach the lithostatic pressure $p_1$ of the formation. The ratio of the two pressures, commonly designated $\lambda$, increases toward unity. The strength of the rock formation is weakened according to the relation:

$$\sigma_{critical} = \sigma_0 + (1-\lambda)p_1$$

When the value of $\lambda$ becomes very large, the critical strength ($\sigma_{critical}$) becomes smaller. Finally, the critical strength ($\sigma_{critical}$) is so small that it is less than the residual stress difference ($\sigma_1 - \sigma_3$) in the earth crust as that depth of the region. At that moment, a vertical extensional fracture will form in a direction parallel the orientation of the horizontal well if the well is drilled to a depth of more than 1000 or 1500 m. The half-width of the fracture from the borehole depends upon numerous factors, such as the permeability of the reservoir, the rate of pressure build-up, etc. The half-width is commonly a few tens of meters. Production engineers should use simulation studies prior to the hydrofracturing to determine the rate of pressure build-up so that the half-width of the fracture is equal to, but not greater than, the thickness (or height) of the oil-bearing formation.

After the fracture surface is made, proppants can be injected into the fracture, so that a source aquifer is created to serve as the source of fluid to be injected during EOR. The same process of hydrofracturing is repeated in the parallel horizontal well, which is to be selected as the production or extraction well. The artificial aquifer created in that well forms the sink aquifer serving as the sink of fluid produced during EOR.

After both artificial aquifers formed by hydrofracturing are installed, fluid such as water, steam, or inert gas is pumped into the perforated interval of the injection well casing. At the same time, fluid is pumped out of the perforated interval of the production well casing. A pressure gradient is thus established so that the injected fluid will move in a direction perpependicular to the hydro-fractured surfaces from the source aquifer to the sink aquifer as shown by the directional arrows in FIG. 2.

Theoretically, water injected into production interval $s_2$ will move in a direction from source aquifer 17 to sink aquifer 19, sweeping the oil under the $s_2$ interval area 18 between the aquifers. Local imperfections may lead to leakage of injected fluid to the reservoir rock under $s_1$ interval area 15 which has been previously exploited but is now filled with water. To hinder such lateral leakage of injected fluid, thin strips 10 of the oil reservoir 12 under the area between areas 15 and 18 and under the area between 18 and 21 can be left unexploited.

An oil field can be divided into different unit cells of exploitation with each cell located between two horizontal wells. Using this technique, the sweeping efficiency of EOR is very high.

Exploitation of Tar Sands

In application Ser. No. 08/852,327 and Ser. No. 09/041,503 noted above, heavy oil, tar sands, and gas hydrates are extracted from between two horizontal aquifers, or from between a horizontal artificial aquifer and a well. Since such deposits commonly occur at a shallow depth, the least principal stress in the earth's crust lies in the vertical direction. Hydrofractured surfaces at a depth of a few hundred meters extend perpendicular to the least principal stress. They are thus horizontal fractures into which proppants can be injected to make horizontally extending artificial aquifers.

One current practice of in-situ exploitation of hydrocarbons from sand is the so-called steam-injection-gravity-drainage method (SIGD). A pair of horizontal wells, one above another, is drilled. Steam is injected from the upper well, causing the hydrocarbon tar to become less viscous so that fluid hydrocarbons are drained under gravity to the lower well, from which they are extracted. The disadvantage of this method is the high cost. Temperature rises only in the immediate vicinity of the borehole to lower the viscosity of the tar, and the rate of hydrocarbon production induced by well-to-well injection is very slow. It takes much steam and many years to drain the tar as hydrocarbons between a pair of wells. The process described by the above-noted applications makes use of the fact that a large quantity of fluid flow can be made to flow vertically across a very large cross-sectional area. When all other factors are the same, the fluid moving across an area of, for example 400 m×400 m (160,000 m$^2$) is much greater than that across the small cross-sectional area of a fluid movement from one well to another well.

The hydrofracturing of heavy oil and tar sands has an advantage that the reservoir permeability is low, so that fluid pressure can be built up considerably in favor of hydro-fracturing. The disadvantages are, however, they very small magnitude of residual stress in earth's crust at shallow depth, and the ductility of tar sands. Extensive hydrofracturing may be impossible.

The present invention makes at least one, and commonly two, thin horizontal permeable zones in heavy-oil reservoirs, in tar sands, or in gas hydrates. These thin zones are either created by hydrofracturing, or by injecting a thin stream of steam to remove the hydrocarbons which are plugging the pore-space of the host rock. After the permeable zones are created, they serve as artificial aquifers. Steam can then be injected into such a horizontal permeable zone which serves as a source aquifer, and induced to move across a pressure gradient to another horizontal permeable zone which servers as a sink aquifer. The quantity of hydrocarbon moved per unit time is much greater than the current SIGD method, and the cost of exploitation is much less. Where feasible, it is possible to construct only one artificial aquifer, either as source or sink aquifer, and a well, either a production well or an injection well to provide additional cost savings.

Example Exploitation of Tar Sands in Alberta

Tar sands of Alberta are either mined for factory processing or tars are rendered less viscous by steam injection and are produced are extracted by the SIGD method. In accordance with the invention, a hydrologic cell with two horizontal artificial aquifers formed for steam-injection produces hydrocarbons from tar sands.

Hydro-fracturing can be carried out during the winter season, when tar sands tend to be more brittle and more prone to fracturing. The least principal stress at a shallow depth of a few hundred meters or less is always vertical. The extensional fracture formed by the residual stress within the earth's crust at such depth is thus always horizontal. Hydro-fracturing may not be effective, because the residual stress of a region may not be great enough to cause hydrofracturing of tar sands. Another possibility of making artificial aquifers in tar sands is to recognize the fact that the tar sand becomes a porous and very permeable sandstone after the tar is removed from the pore space of the sandstone. Therefore, in accordance with the invention, two stages in the exploitation of tar sands are preferred: (a) the construction of artificial aquifers, and (b) the injection of steam into the aquifers for recovery of hydrocarbons.

Figure 4:
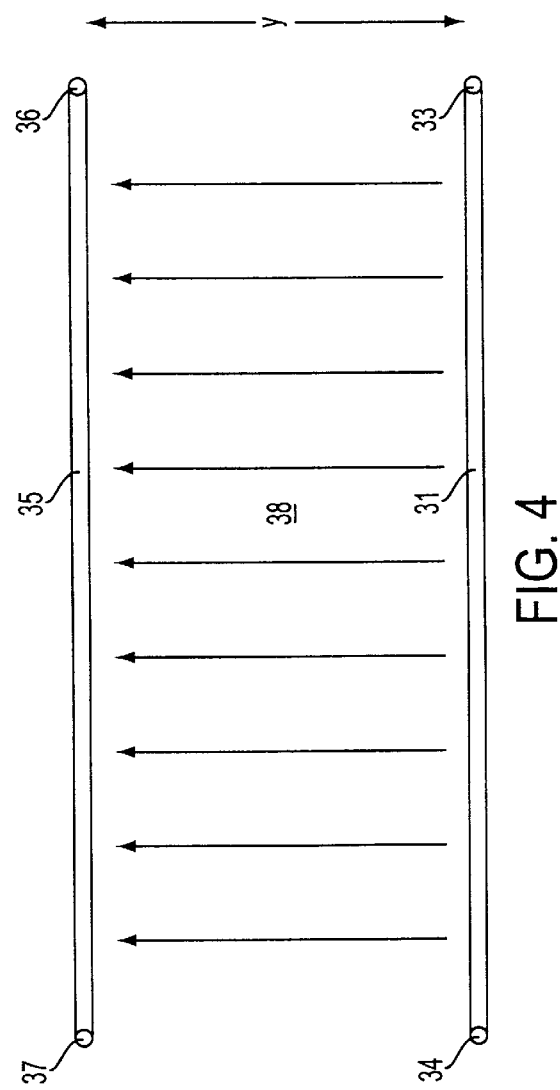
FIG. 4 is a top plan view of an artificial aquifer of the hydrologic cell of FIG. 3, showing the positions of linear belts of porous and permeable zones between two wells, and the movement of hydrocarbons from one linear belt 31 to another linear belt 35, thereby producing an artificial aquifer 38.

As shown schematically in FIGS. 3 and 4, the first stage includes construction of a pair of artificial aquifers 31, 35, either by hydrofracturing or by removing hydrocarbons from host rock, so as to form a hydrologic cell. Two horizons or horizontal planes are selected as the horizons for the source and sink aquifers. Vertical wells 33, 34 are drilled to a depth of z-meters, and the wells are spaced x meters apart. For Alberta tar sand deposits, the wells can be drilled to a depth of one or more dozen meters, and they can be spaced several dozens of meters apart. To concentrate thermal energy to remove tar from the host sand, the perforation of the casing of a borehole for steam injection should be limited to a thin slit, so that steam is injected into a very thin area to force it into a permeable zone, i.e., an artificial aquifer 31 for steam injection during the second stage.

One can use a pair of wells to form a hydrologic cell to remove the hydrocarbons from a very thin zone by the first stage of steam injection between the wells. Steam is injected into a perforated interval of an injection well 33 to convert the tar in a very thin zone 31 into less viscous hydrocarbons to be moved to the production well 34, where it is pumped out. If the tar is too viscous to be moved between the two cells, one can initially use the same well for injection and for production. Eventually, all the tar is removed from the horizon or layer between the two wells.

After the tar in the host-rock between two wells is removed, the sandstone, depleted of its tar, becomes a porous and permeable belt 31. Using the same technique, one can make another belt of porous and permeable sand at the same horizon 35 between another pair of shallow vertical wells 36, 37.

To remove the tar between the two linear belts 31, 35 or permeable sand, steam is injected into one linear belt 31 of the porous and permeable sand to drive the tar out of the intervening area, which has been rendered into less viscous hydrocarbons, into the other belt 35 formed of porous and permeable sand. The result is a thin porous and permeable layer 38 between the two linear belts 31, 35. This horizontal layer of sand which has been depleted of it tar can be selected as the source aquifer. Using the same technique, another porous and permeable layer is formed at another horizon 39, and that horizon can be selected as the sink aquifer. A hydrologic cell with two aquifers 38, 39 is thus constructed.

The second stage is to inject steam into the hydrologic cell for the recovery of hydrocarbons from tar sand. All injection wells 33, 34, 36, 37 are perforated at the deeper, injection horizon 38. Production wells 41, 42 are drilled into the upper sink-aquifer 39. Steam is injected through the lower perforated interval 31 into the porous and permeable source aquifer 38. The tar in the tar sand 40 between the source and sink aquifers is rendered less viscous and is induced to move to the sink aquifer 39. Hydrocarbons are pumped out through production wells 41, 42. The quantity of the hydrocarbons moving across the very large cross-sectional area of the hydrologic cell is large despite the very slow linear movement of the hydrocarbons from the source aquifer 38 to the sink aquifer 39.

There has been disclosed heretofore the best embodiment of the invention presently contemplated. However, it is to be understood that various changes and modifications may be made thereto without departing from the spirit of the invention.

What is claimed is:

1. An underground system for exploitation of hydrocarbons from a host rock formation, said system comprising a hydrologic cell located within said host rock formation, said hydrologic cell having at least one artificial aquifer independently connected to ground surface by boreholes drilled in said host rock formation.

2. The underground system according to claim 1 wherein said aquifer is formed by hydrofracturing around parallel wells drilled horizontally into said host rock formation.

3. The underground system according to claim 1 wherein said at least one aquifer comprises a source aquifer and a sink aquifer and wherein the hydrocarbons are moved under a pressure gradient of fluid flooding from the source aquifer to the sink aquifer.

4. The underground system of claim 3 wherein said host rock formation is divided into a series of production strips and wherein said production strips are sequentially exploited.

5. The underground system of claim 1 wherein said at least one aquifer has large horizontal extent formed by removing the hydrocarbons, in the form of heavy oil, tar, or gas-hydrodrates, and thereby unplugging the pore space of the host rock.

6. The underground system according to claim 1 wherein said at least one aquifer is formed between parallel wells which have been drilled with a direction other than horizontal.

7. The underground system according to claim 1, further comprising a source of pressurized fluid communicating with one of said boreholes.

8. An underground system for exploiting hydrocarbons from an underground formation, comprising:
   a first well formed along a first portion of said formation and defining a first series of production intervals;
   a second well formed along a second portion of said formation said defining a second series of production intervals;
   a series of production strips respectively extending between said first and second production intervals of said first and second wells and through said formation; and
   each of said production strips comprising a source aquifer formed by hydrofracture around said first well and a sink aquifer formed by hydrofracture around said second well.

9. The system of claim 8, wherein said first and second walls each comprise perforated well casings.

10. The system of claim 8, wherein said first and second wells are substantially parallel.

11. The system of claim 8, wherein said production strips extend substantially horizontally through said formation.

12. A method of exploiting hydrocarbons from an underground formation, comprising:
   drilling a first well along a first portion of said formation;
   drilling a second well along a second portion of said formation;
   forming a first artificial aquifer around said first well;
   forming a second artificial aquifer around said second well;
   injecting a pressurized fluid into said first well, through said formation and toward said second well so as to drive said hydrocarbons from said formation and into said second aquifer.

13. The method of claim 12, further comprising forming a series of production strips through said formation between said first and second wells and individually and sequentially injecting said pressurized fluid through said production strips.

14. The method of claim 12 wherein said first and second wells are drilled along a substantially horizontal plane and wherein said method further comprises injecting said pressurized fluid along said horizontal plane.

15. The method of claim 12, wherein said second well extends above said first well, and wherein said method further comprises injecting said steam upwardly from said first well toward and second well.

* * * * *